LEWIS S. CHICHESTER & CHARLES F. CHICHESTER
Grain Drier, Cooler, and Scourer.
No. 121,847. Patented Dec. 12, 1871.

121,847

UNITED STATES PATENT OFFICE.

LEWIS S. CHICHESTER AND CHARLES F. CHICHESTER, OF BROOKLYN, NEW YORK, ASSIGNORS TO CHARLES F. CHICHESTER.

IMPROVEMENT IN GRAIN-DRIERS, COOLERS, AND SCOURERS.

Specification forming part of Letters Patent No. 121,847, dated December 12, 1871.

*To all whom it may concern:*

Be it known that we, LEWIS S. CHICHESTER and CHARLES F. CHICHESTER, of Brooklyn, in the county of Kings and State of New York, have invented an Improvement in Grain-Coolers and Scourers, and the following is declared to be a correct description thereof:

Grain that remains for a considerable time in warehouses, boats, or bins becomes warm and moist, and acquires a musty smell and dull appearance, and dirt and foreign particles adhere to the grain in this condition.

The object of our invention is to remove the moisture and impurities, so as to free the grain from the musty smell and improve its condition and appearance.

We make use of grain-bins with perforated sides surrounding an air-chamber, from which the atmosphere is drawn, so as to dry, cool, and purify the grain by the air passing through the same; we also arrange diaphragms with balanced valves that close by the action of the air when the grain in the perforated bins falls below said diaphragm, thereby insuring the passage of air through the grain instead of simply through the unoccupied portion of the bins. We regulate the flow of grain automatically, so that if there is an accumulation unduly the exit opening is enlarged, and the reverse.

The scouring is effected by means of a rubbing action between the particles of grain, the grain passing into and filling a receptacle with a revolving bottom, that hence rubs one grain against another throughout the mass as it passes down to the place where it receives motion, and this removes any foreign substances that may adhere to the surface of the grain, and the same passes away in the current of air, leaving the grain clean and in a marketable condition.

Figure 1:
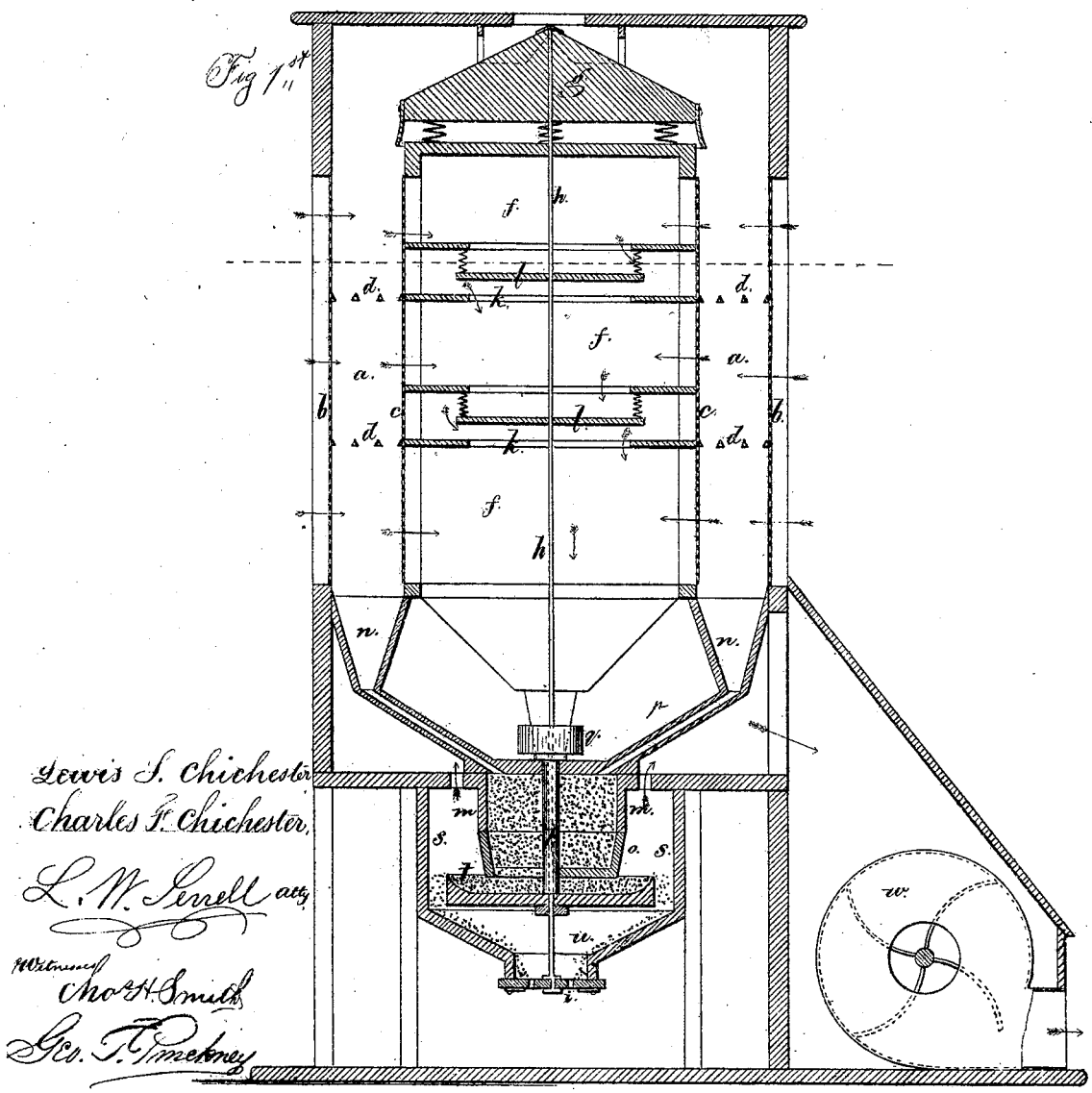
Figure 2:
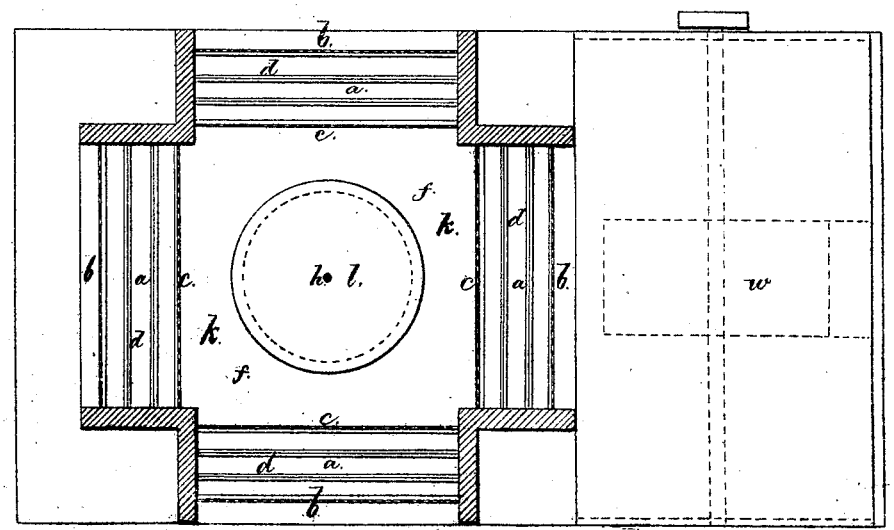

In the drawing, Figure 1 is a vertical section of our grain-cooling and scouring apparatus, and Fig. 2 is a horizontal plan of the bins and air-chamber.

The vertical bins $a\ a$ are made with perforated sides $b$ and $c$, and with $\wedge$-shaped slats $d\ d$ crossing said bins at suitable distances apart, for the twofold purpose of separating, mixing, and stirring the descending column of grain, and for bearing a portion of the weight, so that the grain will not become closely packed. Two or more of these vertical bins can be arranged around a central air-chamber, $f$. I have shown four of these bins. The grain is supplied at the top upon the regulating-platform $g$, that is made pyramidal so as to deflect the grain equally into the respective bins; and this platform is yielding, being suspended or supported by springs or weights, so that when the bins $a$ fill and the grain banks up on this platform $g$ its weight will move the platform $g$ downward, and by the rod $h$ and escape-valve $i$ at the bottom of the apparatus, open the delivery-orifice, so as to increase the rapidity of discharge; and as the platform $g$ rises by the grain running off the same, the discharge-valve will proportionally close; thereby the apparatus is rendered automatic, or nearly so, and the bins $a\ a$ will remain full while the proper supply is maintained; but should the supply cease or be checked the grain will descend, so that it will not be as high as the upper part of the perforated bins; therefore the air would pass unobstructed through the perforations in the said bins and not through the portion filled with grain. To prevent this we employ diaphragms $k\ k$, in the air-chamber $f$, with openings therein, and suspended or supported balance valves $l\ l$, that are held in a normal position by springs or weights, and as soon as the air can rush into the chamber unobstructed by the grain the upper valve $l$ is drawn down and closes the upper diaphragm, and so of the next as the grain descends, in each instance compelling the air to enter the chamber $f$ through the grain itself in the bins. It is to be understood that the rush of air past the valves $l\ l$ is not sufficient to close them when the bins are full of grain. The bottom of each bin is made in the shape of a hopper, with a chute, $n$, leading to the scourer. The cylinder $m$ is a fixture, and the lower part $o$ of the scourer is mounted upon the hollow shaft $p$, so as to be revolved by power applied to the pulley $q$. By this device the grain filling the cylinders $m$ and $o$ is subjected to a violent rubbing action of one particle against another because the grain in the lower part will be revolved with and by the cylinder $o$, and the grain in the upper part will not be revolved; hence the moving grain will rub against the quiescent grain, or that which has a slower movement. An opening in the cylinder $o$ allows the grain to be thrown off into the cases above the plate $t$, where the air that is admitted conveys any dust away to the exhausted chamber $f$. The disk or plate $t$ scatters and scours the grain and it passes to the delivery-hopper $u$, at the bottom of which is the valve $i$, before named. In this valve $i$ are openings that allow the grain to pass away regularly; but if there is an accumulation of grain in the bins the valve opens, allowing the discharge to be more rapid, as before described. A blower is shown at $w$ as a means of exhausting the chamber $f$, but any suitable means may be employed for that purpose.

We claim as our invention—

1. The vertical bins of perforated material, into which the grain is supplied, in combination with the slats $d$ $d$, that cross said bins and partially sustain the weight of the grain and agitate the same as it descends, as set forth.

2. The balance-valves $l$ $l$ in the diaphragms of the air-chamber $f$, in combination with the bins $a$ of perforated material, as and for the purposes set forth.

3. The yielding regulating-platform $g$ connected to the valve $i$, in combination with the bins $a$, for the purposes and substantially as set forth.

4. The scouring mechanism, composed of a revolving cylinder below a stationary cylinder or feeding device, as and for the purposes set forth.

5. The revoving disk, connected to the scouring-cylinder by its shaft, and receiving the cleaned grain previous to its delivery, as and for the purposes set forth.

Signed by us this 9th day of September, A. D. 1871.

LEWIS S. CHICHESTER.
CHAS. F. CHICHESTER.

Witnesses:
GEO. T. PINCKNEY,
CHAS. H. SMITH.

(48)